United States Patent [19]  
Friedle et al.

[11] Patent Number: 4,671,773  
[45] Date of Patent: Jun. 9, 1987

[54] MARINE PROPULSION INSTALLATION INCLUDING FUEL CONDUIT COUPLING APPARATUS

[75] Inventors: Dennis J. Friedle, Lake Villa; Richard P. Kolb, Gages, both of Ill.

[73] Assignee: Outboard Marine Corporation, Waukegan, Ill.

[21] Appl. No.: 794,000

[22] Filed: Nov. 1, 1985

[51] Int. Cl.4 ........................................... B63H 21/38
[52] U.S. Cl. ..................... 440/88; 137/322; 137/614.01; 141/290; 141/291; 251/149.3
[58] Field of Search ............ 440/88; 114/212; 137/322, 614.01, 614.04, 614.06; 251/116, 149.3, 149.6; 141/290, 291, 301, 302, 325, 326, 346, 347

[56] References Cited

U.S. PATENT DOCUMENTS

| | | | |
|---|---|---|---|
| 995,832 | 6/1911 | Winton | 251/149.3 |
| 2,708,588 | 5/1955 | Prah | 251/149.6 |
| 2,730,380 | 1/1956 | Espy et al. | 284/19 |
| 2,864,628 | 12/1958 | Edleson | 284/18 |
| 3,144,056 | 8/1964 | Mosher | 141/192 |
| 3,205,923 | 9/1965 | Wilson | 141/291 |
| 3,435,848 | 4/1969 | Johnston | 137/614.04 |
| 3,732,902 | 5/1973 | Muller | 141/198 |
| 4,082,112 | 4/1978 | Schmidt | 137/614.03 |
| 4,084,614 | 4/1978 | Ekman | 137/614.03 |
| 4,144,901 | 3/1979 | Stevenson | 137/240 |
| 4,211,253 | 7/1980 | Ekman | 137/594 |
| 4,269,219 | 5/1981 | Dybvig | 137/322 |
| 4,327,770 | 5/1982 | Brown et al. | 137/614.05 |
| 4,458,719 | 7/1984 | Strybel | 137/614.03 |
| 4,502,516 | 3/1985 | Shields | 141/290 |
| 4,506,649 | 3/1985 | Hunt et al. | 137/322 X |

Primary Examiner—Joseph F. Peters, Jr.  
Assistant Examiner—Paul E. Salmon  
Attorney, Agent, or Firm—Michael, Best & Friedrich

[57] ABSTRACT

A marine propulsion installation comprising a propulsion unit adapted to be pivotally mounted on the transom of a boat for pivotal movement relative to the transom about a generally vertical steering axis, the propulsion unit including a rotatably mounted propeller, and an engine connected to the propeller, a fuel conduit having a first end communicating with the engine for supplying fuel thereto, and a second end, a fuel tank defining a fuel chamber adapted to contain fuel, and a coupling apparatus including a first member mounted on the fuel tank and including an air ventilation passage communicating with the fuel chamber, a valve member movable between a closed position and an open position for respectively closing and opening the air ventilation passage, a pivotal lever movable between a first position and second position for respectively moving the valve member from the closed position to the open position, a spring for biasing the lever to the first position, and a first fuel pasageway including a first end communicating with the fuel chamber, and a second end, a second member adapted to be connected with the first member and including a projection for moving the lever from the first position to the second position against the force of the biasing spring when the first member is connected with the second member, and a second fuel passageway including a first end communicating with the fuel conduit and a second end adapted to be connected to the second end of the first fuel passageway to allow fuel to flow from the fuel chamber to the fuel conduit through the first and second fluid passageways when the first and second members are connected.

30 Claims, 9 Drawing Figures

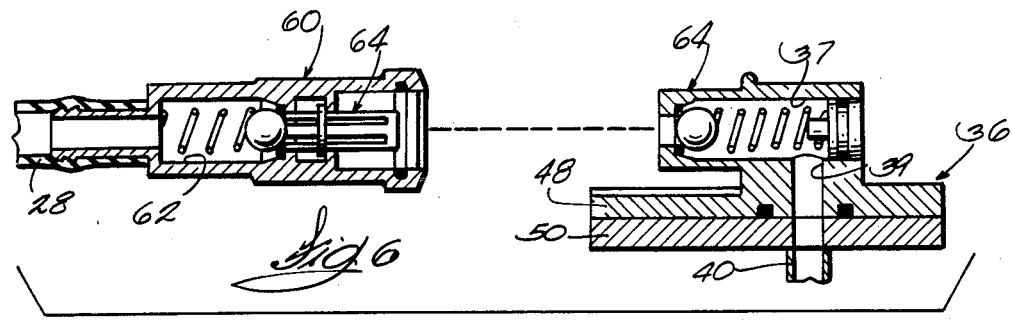
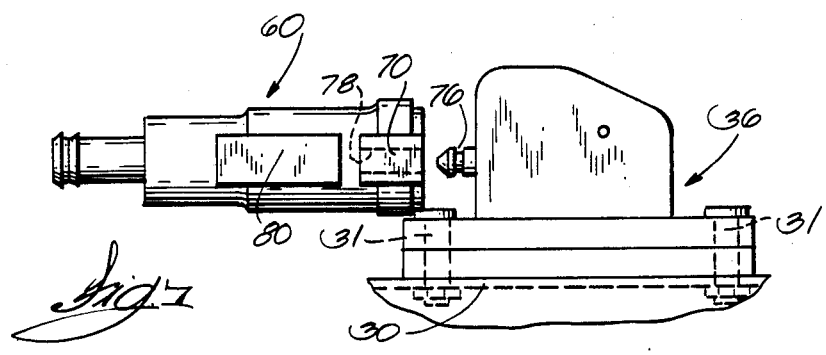
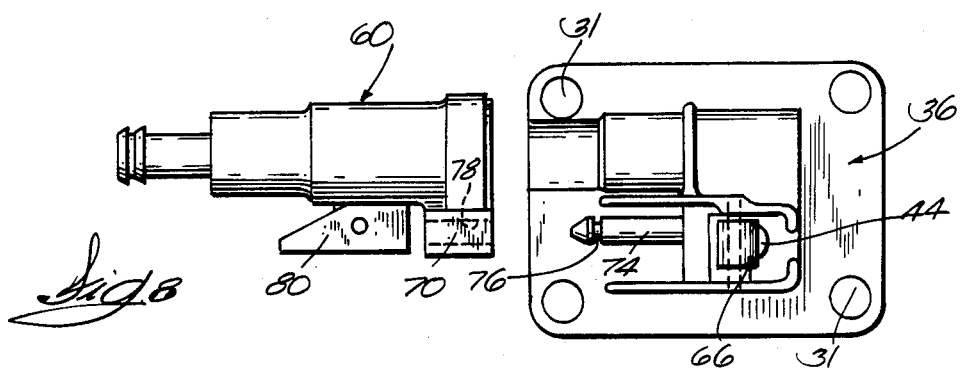
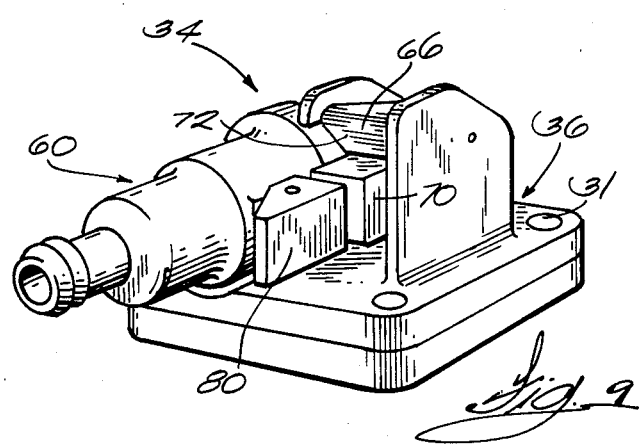

MARINE PROPULSION INSTALLATION INCLUDING FUEL CONDUIT COUPLING APPARATUS

BACKGROUND OF THE INVENTION

The invention relates to marine propulsion installations, and more particularly to marine fuel distribution systems. Still more particularly, the invention relates to coupling apparatus for connecting an engine fuel conduit to a fuel tank.

Present marine fuel distribution systems typically include a fuel tank, a fuel conduit connected to an engine of a marine propulsion device, and a coupling apparatus for connecting the fuel conduit to the fuel tank. Such a coupling apparatus typically includes a first member connected to the fuel tank, and a second member connected to the fuel conduit and removably connected to the first member.

It is known to provide such a coupling apparatus having an air ventilation passage communicating with the fuel tank, a valve for opening and closing the passage, and means for opening the valve when the first member is connected to the second member. Such arrangements are disclosed in U.S. Pat. Nos. 4,269,219 and 3,205,923. These patents do not disclose means for opening the valve independently of connection of the first and second members. For example, it may be desirable to open the air ventilation passage when the fuel tank is disconnected from the engine (when the first and second members are disconnected) and fuel is being poured out of the fuel tank.

Attention is also directed to the following U.S. patents which disclose coupling and ventilation apparatus:

| Ehman | 4,084,614 | April 18, 1978 |
| --- | --- | --- |
| Wilson | 3,205,923 | Sept. 14, 1965 |
| Strybel | 4,458,719 | July 10, 1984 |
| Muller | 3,732,902 | May 15, 1973 |
| Johnston | 3,435,848 | April 1, 1969 |
| Schmidt | 4,082,112 | April 9, 1978 |
| Stevenson | 4,144,901 | March 20, 1979 |
| Elaman | 4,211,253 | July 8, 1980 |
| Brown | 4,327,770 | May 4, 1982 |
| Shields | 4,502,516 | March 5, 1985 |
| Espy | 2,730,380 | Jan. 10, 1956 |
| Edleson | 2,864,628 | Dec. 16, 1958 |
| Mosher | 3,144,056 | Aug. 11, 1964 |

SUMMARY OF THE INVENTION

The invention provides a marine propulsion installation comprising a propulsion unit adapted to be pivotally mounted on the transom of a boat for pivotal movement relative to the transom about a generally vertical steering axis, the propulsion unit including a rotatably mounted propeller, and an engine drivingly connected to the propeller, a fuel conduit having a first end communicating with the engine for supplying fuel thereto, and a second end, and a fuel tank defining a fuel chamber adapted to contain fuel. The installation also comprises a coupling apparatus including a first member mounted on the fuel tank, the first member including an air ventilation passage communicating with the fuel chamber, a valve member movable between a closed position and an open position for respectively closing and opening the air ventilation passage, and a first fuel passageway having a first end communicating with the fuel chamber, and a second end, a second member adapted to be connected to the first member, the second member including a second fuel passageway having a first end communicating with the second end of the fuel conduit, and a second end adapted to be connected to the second end of the first fuel passageway to allow fuel to flow from the fuel chamber to the fuel conduit through the first and second fuel passageways when the first and second members are connected, a pivotal lever movable between a first position and a second position for respectively moving the valve member from the closed position to the open position, means for biasing the lever to the first position, and means for moving the lever from the first position to the second position against the force of the biasing means when the first member is connected to the second member.

The invention also provides a fluid coupling apparatus comprising a first member including an air ventilation passage, and a valve member movable between a closed position and an open position for respectively closing and opening the air ventilation passage, a second member adapted to be connected to the first member, a pivotal lever movable between a first position and a second position for respectively moving the valve member from the closed position to the open position, means for biasing the lever to the first position, and means for moving the lever from the first position to the second position against the force of the biasing means when the first member is connected to the second member.

In one embodiment, the lever is mounted on the first member, and the means for biasing the lever includes means for biasing the valve member toward the closed position.

In one embodiment, the lever is mounted on the first member, the lever is manually movable to a third position for moving the valve member to the open position, and the apparatus further comprises manually operable means for moving the valve member to the open position, the manually operable means including the lever, and means for retaining the lever in the third position in the absence of an externally applied force.

In one embodiment, the means for retaining the lever in the third position includes over-center means.

In one embodiment, the biasing means includes a spring.

In one embodiment, the second member has therein an aperture, and the first member includes a pin extending through the aperture when the first and second members are connected.

In one embodiment, the second member includes a pivotal latch for engaging the pin when the first and second members are connected.

In one embodiment, the second member includes a projection having therein the aperture and being engageable with the lever when the first and second members are connected, and the means for moving the lever from the first position to the second position includes the projection.

The invention also provides a fluid coupling apparatus comprising a first member including an air ventilation passage, and a valve member movable between a closed position and an open position for respectively closing and opening the air ventilation passage, a second member adapted to be connected to the first member, valve control means for moving the valve member to the open position when the first member is connected to the second member, and manually operable means for moving the valve member to the open position.

A principal feature of the invention is the provision of a fluid coupling apparatus comprising a first member including an air ventilation passage, and a valve member movable between closed and open positions for respectively closing and opening the air ventilation passage, the apparatus further comprising a pivotal lever or member movable between a first position and a second position for respectively moving the valve member from the closed position to the open position, means for biasing the lever to the first position, and means for moving the lever from the first position to the second position against the force of the biasing means when the first member is connected to the second member.

Another principal feature of the invention is the provision of manually operable means for moving the valve member to the open position. This permits the air ventilation passage to be opened when the first and second members of the coupling apparatus are disconnected. This is desirable in order to permit fuel to be poured smoothly out of the fuel tank.

Another principal feature of the invention is the provision of a lever which is manually movable to a third position for moving the valve member to an open position. This arrangement provides a single means for opening the air ventilation passage when the first and second members are connected, and for permitting manual opening of the air ventilation passage.

Other principal features and advantages of the invention will become apparent to those skilled in the art upon review of the following detailed description, claims and drawings.

DESCRIPTION OF THE DRAWINGS

FIG. 6 is a cross-sectional view taken along line 6—6 in FIG. 5 but showing the first and second members disconnected.

FIG. 7 is a side elevational view of the coupling apparatus disconnected.

FIG. 8 is a top view of the coupling apparatus disconnected.

FIG. 9 is a perspective view of the coupling apparatus connected.

Figure 1:
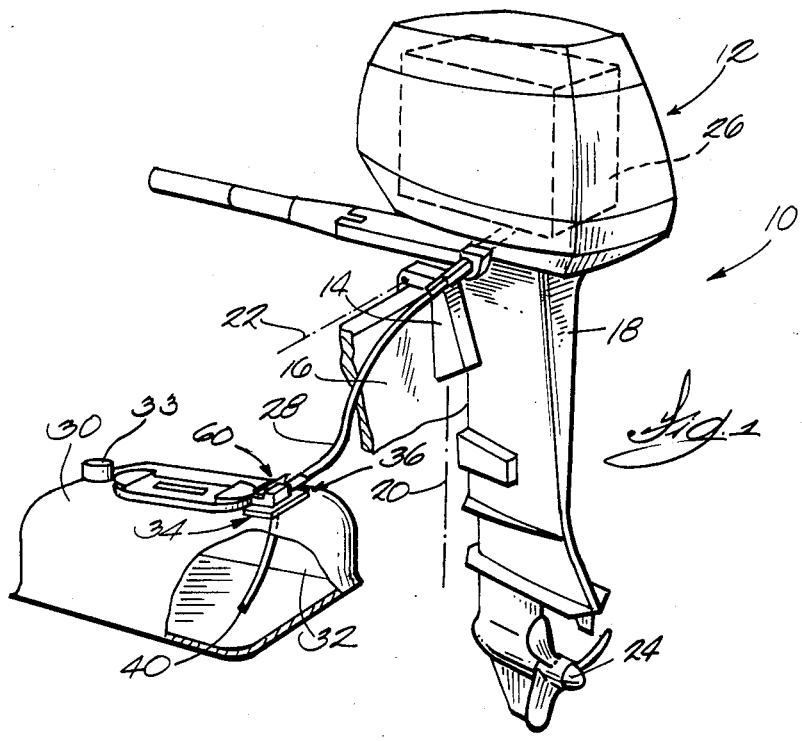
FIG. 1 is a perspective view of a marine propulsion installation embodying the invention. The installation comprises a coupling apparatus including a first member mounted on a fuel tank, and a second member connected to a fuel conduit.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion installation 10 embodying the invention is illustrated in the drawings. As best shown in FIG. 1, the installation 10 comprises a marine propulsion device 12 including a mounting assembly 14 fixedly attached to the transom 16 of a boat. The marine propulsion device 12 further includes a propulsion unit 18 mounted on the mounting assembly 14 for pivotal movement relative to the transom 16 about a generally vertical steering axis 20, and about a generally horizontal tilt axis 22.

The propulsion unit 18 includes a rotatably mounted propeller 24, and an engine 26 drivingly connected to the propeller 24. In the preferred embodiment, the marine propulsion device 12 is an outboard motor. In alternative embodiments, the marine propulsion device 12 can be a stern drive unit.

The marine propulsion installation 10 also comprises a fuel conduit 28 having a first or rearward end communicating with the engine 26 for supplying fuel thereto, and a second or forward end. The installation 10 further comprises a fuel tank 30 defining a fuel chamber 32 adapted to contain fuel, the fuel tank 30 including a filler opening communicating with the fuel chamber 32, and a removable cap 33 covering the filler opening. The installation further comprises a coupling apparatus 34 for connecting the fuel tank 30 to the fuel conduit 28.

Figure 2:
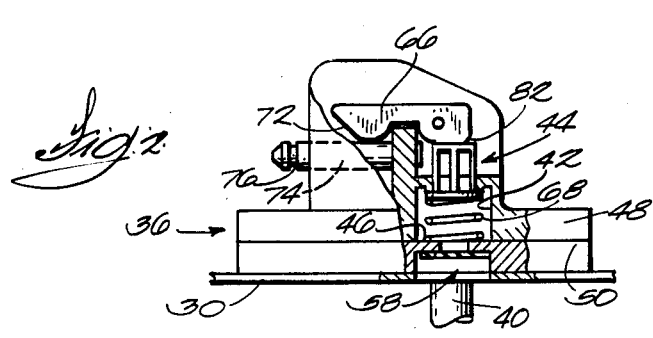
FIG. 2 is an enlarged cross-sectional view of the first member of the coupling apparatus shown in FIG. 1.
Figure 3:
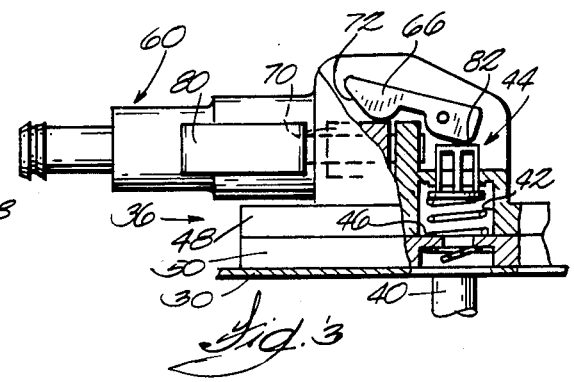
FIG. 3 is a view similar to FIG. 2 showing the first and second members connected.

As shown in FIGS. 2-9, the coupling apparatus 34 includes a first member 36 mounted on the fuel tank 30. In the illustrated construction, the first member 36 is mounted on the fuel tank 30 by a plurality of bolts 31 (FIGS. 7 and 8). The first member 36 includes a first fuel passageway 37 (FIGS. 5 and 6) having a first or upstream end (the right end in the drawings) communicating with the fuel chamber 32 via a fuel intake passage 39 and a fuel intake tube 40 extending downwardly into the fuel chamber 32, and a second or downstream end (the left end in the drawings). The first member 36 also includes an air ventilation passage 42 (FIGS. 2-5) generally parallel to the fuel intake passage 39 (see FIG. 5) and communicating with the fuel chamber 32 via an opening 43 (FIGS. 2-4) spaced from the fuel intake tube 40, and a valve member 44 movable between a closed position (FIG. 2) and an open position (FIGS. 3 and 4) for respectively closing and opening the air ventilation passage 42. Preferably, as shown in FIGS. 2 and 3, the air ventilation passage 42 has a restricted portion defining a shoulder 46, the reason for which is explained hereinafter. In the preferred embodiment, the first member 36 includes upper and lower portions 48 and 50, respectively, and the restricted portion and shoulder 46 are formed by the lower portion 50.

Figure 4:
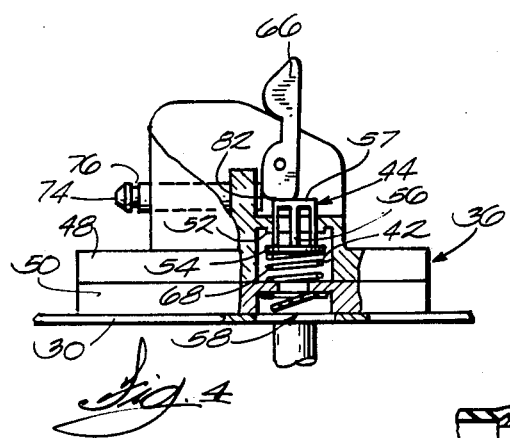
FIG. 4 is a cross-sectional view of the first member with the lever in the third position.

In the preferred embodiment, as shown in FIG. 4, the air ventilation passage 42 includes a valve seat 52, and the valve member 44 includes a disc portion 54 movable into and out of engagement with the valve seat 52 for respectively closing and opening the ventilation passage 42. The valve member 44 also includes a circular cage portion 56 integrally connected to the disc portion 54 and including an upper end 57.

In the preferred embodiment, the first member 36 further includes (see FIGS. 2 and 4) check valve means 58 for preventing the escape of vapors from the fuel chamber 32 through the air ventilation passage 42, and for permitting air to enter the fuel chamber 32 through the air ventilation passage 42. Thus, during operation of the marine propulsion device 12, the check valve means 58 permits air to enter the fuel chamber 32 through the air ventilation passage 42 in order to replace fuel leaving the fuel chamber 32 via the fuel intake tube 40.

The coupling apparatus 34 further includes a second member 60 adapted to be connected to the first member 36, the second member 60 including a second fuel passageway 62 (FIGS. 5 and 6) having a first or downstream end (the left end in the drawings) communicating with the forward end of the fuel conduit 28, and a second or upstream end (the right end in the drawings) adapted to be connected to the downstream end of the first fuel passageway 37 to allow fuel to flow from the fuel chamber 32 to the fuel conduit 28 (and eventually to the engine 26) through the first and second fuel passageways 37 and 62 when the first and second members 36 and 60 are connected.

Figure 5:
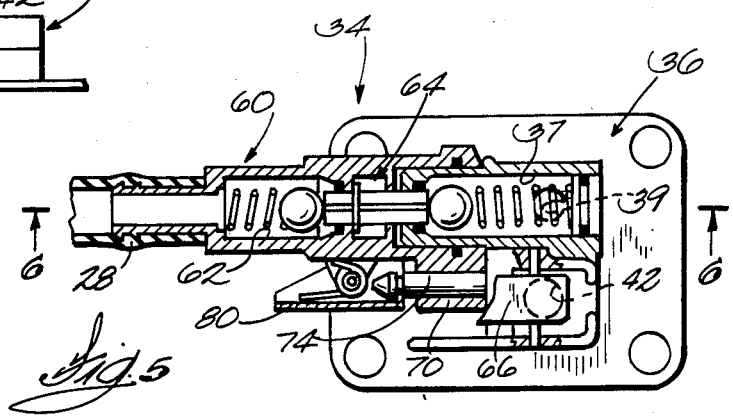
FIG. 5 is a top view, partially in cross-section, of the first and second members connected.

In the preferred embodiment, as shown in FIGS. 5 and 6, the first and second members 36 and 60 also include cooperating valve means 64 for sealingly closing the second ends of the first and second passageways 37 and 62 when the first and second members 36 and 60 are disconnected, and for permitting communication of the second ends of the first and second passageways 37 and 62 when the first and second members 36 and 60 are connected. Such cooperating valve means 64 are known in the art and need not be described in greater detail. An example of suitable cooperating valve means is disclosed in U.S. Espy Pat. No. 2,730,380, which is incorporated herein by reference.

The coupling apparatus 34 further includes valve control means for moving the valve member 44 to the open position when the first member 36 is connected to the second member 60. While various suitable valve control means can be used, in the preferred embodiment, the valve control means includes a member or lever 66 movable between a first position (FIG. 2) and a second position (FIG. 3) for respectively moving the valve member 44 from the closed position to the open position. In the preferred embodiment, the lever 66 is pivotally mounted on the first member 36 and includes an end (the right end in the drawings) which engages the upper end 57 of the valve member 44. Clockwise pivotal movement of the lever 66 causes the right end of the lever 66 to move downwardly, thereby moving the valve member 44 downwardly.

The valve control means preferably further includes means for biasing the lever 66 to the first position. While various suitable lever biasing means can be used, in the illustrated construction, the lever biasing means includes means for biasing the valve member 44 upwardly or toward the closed position. While various suitable means for biasing the valve member 44 can be employed, in the preferred embodiment, the valve member biasing means includes a spring 68 extending between the valve member 44 and the shoulder 46 in the air ventilation passage 42. In the absence of an opposing force on the lever 66, the spring 68 moves the valve member 44 upwardly, thereby closing the air ventilation passage 42 and moving the lever 66 toward the first position.

The valve control means preferably further includes means for moving the lever 66 from the first position to the second position (clockwise in the drawings) against the force of the lever biasing means when the first member 36 is connected to the second member 60. This moves the valve member 44 from the closed position to the open position. While various suitable means for moving the lever 66 means can be used, in the illustrated construction, such means includes, on the second member 60, a projection 70 (FIGS. 3, 5 and 7-9). Preferably, the left end of the lever 66 includes a cam surface 72 (FIGS. 2, 3 and 9), and the projection 70 is located such that, when the second member 60 is connected to the first member 36, the projection 70 engages the cam surface 72 so as to move the left end of the lever upwardly, thereby moving the lever 66 from the first position to the second position.

In the preferred embodiment, the apparatus 34 further includes guide means for aligning the second member 60 with the first member 36. Accordingly, the first member 36 includes a generally horizontally extending pin 74 (FIGS. 2, 4 and 5), and the projection 70 has therein an aperture 78 (FIG. 7) adapted to have the pin 74 extend therethrough. In alternative embodiments, the aperture 78 can be located elsewhere on the second member 60.

In the preferred embodiment, the apparatus 34 further includes means for securing the second member 60 to the first member 36. Preferably, the securing means includes, on the pin 74, a groove 76, and, on the second member 60, a pivotal latch 80 (FIGS. 3, 5 and 7-9) for engaging the groove 76 when the first and second members are connected. Such a construction is known in the art and need not be described in greater detail.

The coupling apparatus 34 further includes manually operable means for moving the valve member 44 to the open position. While various suitable manually operable means can be employed, in the illustrated construction, the manually operable means includes means for retaining the valve member 44 in the open position in the absence of an externally applied force. While various suitable valve member retaining means can be used, in the preferred embodiment, the lever or member 66 is movable to a third or vertical position (FIG. 4) for moving the valve member 44 to the open position, and the valve member retaining means includes the lever or member 66, and means for retaining the lever or member 66 in the third position (thereby retaining the valve member 44 in the open position) in the absence of an externally applied force.

While various suitable lever retaining means can be used, in the illustrated construction, such means includes over-center means. While various suitable over-center means can be used, in the preferred embodiment, the right end of the lever 66 includes two generally perpendicular surfaces converging to form a projection 82 (FIGS. 2-4), and the over-center means includes the pivotally mounted lever 66, the projection 82, the valve member 44, and the spring 68. As shown in FIG. 4, when the lever 66 is between the over-center position (the position wherein the projection 82 engages the upper end 57 of the valve member 44) and the vertical position, the upward force exerted on the lever 66 by the valve member 44 biases the lever 66 toward the vertical position. Thus, in the absence of an externally applied force, the lever 66 will remain in the vertical position regardless of whether the first member 36 is connected to the second member 60. On the other hand, as shown in FIG. 3, when the lever 66 is between the second position and the over-center position, the upward force exerted on the lever 66 by the valve member 44 biases the lever 66 toward the second position. Movement of the lever 66 to the third or vertical position while the first and second members are disconnected permits smooth pouring of fuel out of the fuel tank 30 through the filler opening and prevents the formation of a vacuum in the fuel chamber 32 during such pouring. It should be noted that when the tank 30 is filled via the filler opening, air escapes from the fuel chamber 32 via the filler opening. During such filling the check valve means 58 is closed.

The coupling apparatus 34 operates as follows: When the first and second members are disconnected, the cooperating valve means 64 closes the second ends of the first and second passageways 37 and 62. If the lever 66 is in the third or vertical position, the valve member 44 is moved downwardly such that the air ventilation passage 42 is opened. If the lever 66 is not in the third position, the spring 68 moves the valve member 44 upwardly to close the air ventilation passage 42, and the valve member 44 moves the lever 66 to the first position.

When the first and second members are connected, and assuming the lever 66 is in the first position before connection of the first and second members, several things occur simultaneously. First, the cooperating valve means 64 permits communication of the second ends of the first and second passageways 37 and 62, thereby permitting communication of the fuel chamber 32 with the fuel conduit 28. Second, the pin 74 extends through the aperture 78 and is engaged by the latch 80. Third, the projection 70 engages the lever 66, thereby moving the lever 66 to the second position. This moves the valve member 44 downwardly against the force of the spring 68 to open the air ventilation passage 42. If the lever 66 is in the third position prior to connection of the first and second members, the projection 70 will not engage the lever 66 and the lever 66 will remain in the third position subsequent to connection of the first and second members.

Various features and advantages of the invention are set forth in the following claims.

We claim:

1. A marine propulsion installation comprising a propulsion unit adapted to be pivotally mounted on the transom of a boat for pivotal movement relative to the transom about a generally vertical steering axis, said propulsion unit including a rotatably mounted propeller, and an engine drivingly connected to said propeller, a fuel conduit having a first end communicating with said engine for supplying fuel thereto, and a second end, a fuel tank defining a fuel chamber adapted to contain fuel, and a coupling apparatus including a first member mounted on said fuel tank and including an air ventilation passage communicating with said fuel chamber, a valve member movable between a closed position and an open position for respectively closing and opening said air ventilation passage, and a first fuel passageway having a first end communicating with said fuel chamber, and a second end, a second member adapted to be removably connected to said first member, said second member including a second fuel passageway having a first end communicating with said second end of said fuel conduit, and a second end adapted to be connected to said second end of said first fuel passagway to allow fuel to flow from said fuel chamber to said fuel conduit through said first and second fuel passageways when said first and second members are connected, a pivotal lever movable between a first position locating said valve member in said closed position in response to disconnection of said second member from said first member, a second position locating said valve member in said open position in response to connection of said second member to said first member, and a third position locating said valve member in said open position in response to manual movement of said lever, and means for biasing said lever to said first position.

2. The installation of claim 1 wherein said lever is mounted on said first member, and wherein said means for biasing said lever includes means for biasing said valve member toward said closed position.

3. The installation of claim 1 wherein said lever is mounted on said first member, and further including means for retaining said lever in said third position in the absence of an externally applied force.

4. The installation of claim 3 wherein said means for retaining said lever in said third position includes over-center means.

5. The installation of claim 4 wherein said biasing means includes a spring.

6. The installation of claim 1 wherein said second member has therein an aperture, and wherein said first member includes a pin extending through said aperture when said first and second members are connected.

7. The installation of claim 6 wherein said second member includes a pivotal latch for engaging said pin when said first and second members are connected.

8. The installation of claim 6 wherein said second member includes a projection having therein said aperture and being engageable with said lever when said first and second members are connected so as to effect movement of said lever from said first position to said second position.

9. A fluid coupling apparatus comprising a first member including an air ventilation passage, and a valve member movable between a closed position and an open position for respectively closing and opening said air ventilation passage, a second member adapted to be releasably connected to said first member, a lever movable between a first position locating said valve member in said closed position in response to disconnection of said second member from said first member a second position locating said valve member in said open position in response to connection of said second member to said first member, and a third position locating said valve member in said open position in response to manual movement of said lever, and means for biasing said lever to said first position.

10. The apparatus of claim 9 wherein said first member includes a first fluid passageway having a first end adapted to be connected to a fluid container, and a second end, and wherein said second member includes a second fluid passageway having a first end adapted to be connected to a fluid conduit, and a second end adapted to be connected to said second end of said first passageway to allow fluid flow from the container to the fluid conduit through said first and second fluid passageways when said first and second members are connected.

11. The apparatus of claim 9 wherein said lever is mounted on said first member, and wherein said means for biasing said lever also serves to bias said valve member toward said closed position.

12. The apparatus of claim 9 wherein said lever is mounted on said first member, and further including means for retaining said lever in said third position in the absence of an externally applied force.

13. The apparatus of claim 12 wherein said means for retaining said lever in said third position includes over-center means.

14. The apparatus of claim 13 wherein said biasing means includes a spring.

15. The apparatus of claim 9 wherein said second member has therein an aperture, and wherein said first member includes a pin extending through said aperture when said first and second members are connected.

16. The apparatus of claim 15 wherein said second member includes a pivotal latch for engaging said pin when said first and second members are connected.

17. The apparatus of claim 15 wherein said second member includes a projection having therein said aperture and being engageable with said lever when said first and second members are connected so as to effect movement of said lever from said first position to said second position.

18. A fluid coupling apparatus comprising a first member including an air ventilation passage, and a valve member movable between a closed position and an open position for respectively closing and opening said air ventilation passage, a second member adapted to be removably connected to said first member, and valve control means movable to a first position for locating said valve member in said closed position in response to disconnection of said second member from said first member, movable to a second position for locating said valve member in said open position in response to connection of said second member to said first member, and movable to a third position for locating said valve member in said open position in response to manual actuation of said valve control means.

19. The apparatus of claim 18 and further including means for retaining said valve control means in said third position in the absence of an externally applied force.

20. The apparatus of claim 19 wherein said valve control means includes a movable member for moving said valve member between said closed position and said open position.

21. The apparatus of claim 20 wherein said movable member is mounted on said first member, and wherein said valve member retaining means includes said movable member.

22. The apparatus of claim 21 wherein said movable member is movable between a first position and a second position for respectively moving said valve member from said closed position to said open position, and wherein said valve control means further includes means for biasing said movable member to said first position, and means for moving said movable member from said first position to said second position against the force of said biasing means when said first member is connected to said second member.

23. The apparatus of claim 22 wherein said means for biasing said movable member also serves to bias said valve member toward said closed position.

24. The apparatus of claim 23 wherein said biasing means includes a spring.

25. The apparatus of claim 22 wherein said movable member is manually movable to a third position for moving said valve member to said open position, and wherein said valve member retaining means further includes means for retaining said movable member in said third position in the absence of an externally applied force.

26. The apparatus of claim 25 wherein said movable member is pivotally mounted on said first member, and wherein said means for retaining said movement member in said third position includes over-center means.

27. The apparatus of claim 22 wherein said second member has therein an aperture, and wherein said first member includes a pin extending through said aperture when said first and second members are connected.

28. The apparatus of claim 27 wherein said second member includes a pivotal latch for engaging said pin when said first and second members are connected.

29. The apparatus of claim 27 wherein said second member includes a projection having therein said aperture and being engageable with said movable member when said first and second members are connected so as to effect movement of said movable member from said first position to said second position.

30. The apparatus of claim 18 wherein said first member includes a first fluid passageway having a first end adapted to be connected to a fluid container, and a second end, and wherein said second member includes a second fluid passageway having a first end adapted to be connected to a fluid conduit, and a second end adapted to be connected to said second end of said first passageway to allow fluid flow from the container to the fluid conduit through said first and second first passageways when said first and second members are connected.

* * * * *